March 23, 1926. Re. 16,298

G. A. SAFSTROM

ELECTRICAL TIMING DEVICE

Original Filed August 21, 1922

Inventor:
Gustaf A. Safstrom,
By Cyrus Smith, Lee, Clinton & Miles
Attys.

Reissued Mar. 23, 1926. Re. 16,298

UNITED STATES PATENT OFFICE.

GUSTAF A. SAFSTROM, OF CHICAGO, ILLINOIS.

ELECTRICAL TIMING DEVICE.

Original No. 1,499,479, dated July 1, 1924, Serial No. 583,262, filed August 21, 1922. Application for reissue filed December 16, 1925. Serial No. 75,880.

*To all whom it may concern:*

Be it known that I, GUSTAF A. SAFSTROM, a citizen of the United States, and a resident of Chicago, in the county of Cook and State of Illinois, have invented a certain new and useful Improvement for Electrical Timing Devices, of which the following is a specification.

My invention relates to electrical timing devices for use more particularly in connection with internal combustion engines to time the ignition of the charges in the cylinders.

My object generally stated is to provide a novel, simple, economical, durable and positively-operating construction of device of the character above stated. More specifically stated, my objects are to reduce the number of binding posts required to be provided on the device; to provide in a timer of the spring type a novel form of spring and arrangement of parts whereby the life of the spring will be greatly extended and will remain operative to perform its function over a relatively long period of time; to provide for the use of a light spring and effect a quick breaking of the circuit therethrough; to provide for the maintaining of the contacts in the desired clean and unpitted condition in the continued use of the device; and other objects as will be manifest from the following description.

Figure 1:
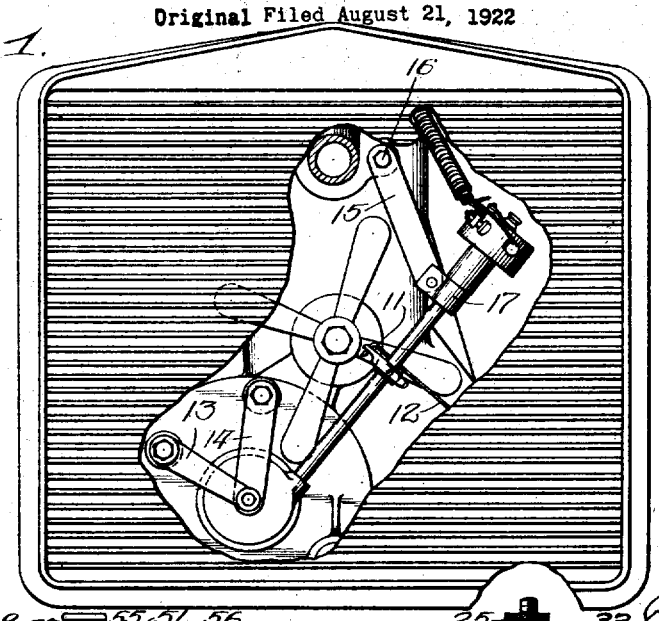
Figure 2:
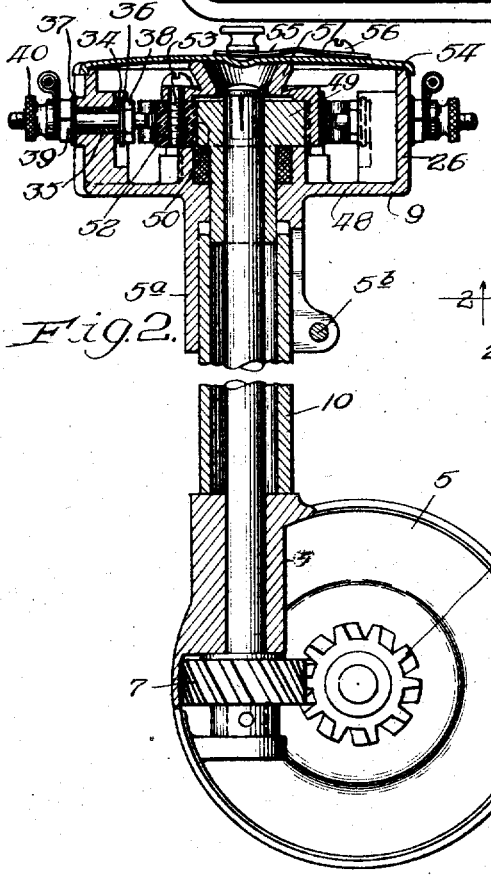
Figure 3:
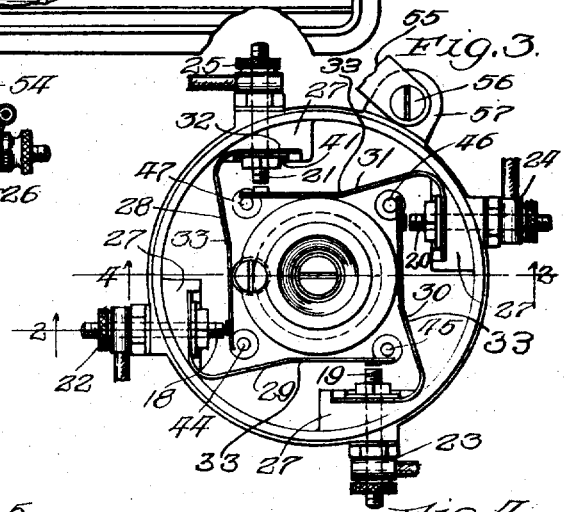
Figure 4:
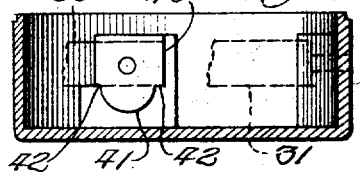

Referring to the accompanying drawing: Figure 1 is a front view of the radiator-equipped portion of a Ford automobile, with a portion of the radiator broken away and equipped with an electrical timing device constructed in accordance with my invention, the latter being shown in side elevation. Figure 2 is a longitudinal sectional view of the device taken at the irregular line 2—2 on Fig. 3 and viewed in the direction of the arrows. Figure 3 is a top view of the device, with the cover removed; and Figure 4, a section taken at the line 4 on Fig. 3 and viewed in the direction of the arrow, the central portion of the device being shown in elevation and certain of the internal parts being omitted.

Since I have devised my improvements for use more particularly in Ford automobiles, I have illustrated it in this connection and as embodied in a structure adapted to be substituted for the timer commonly provided as a part of the equipment of Ford cars and providing for the location of the timing device at such a position on the car as to render it readily accessible, though I do not wish to be understood as intending to limit the invention in any way thereto.

Referring to the particular construction shown, it involves a casing section 5 having journaled therein to extend tangentially thereof, a shaft 6 which is equipped at its lower end with a spiral gear 7 rigid thereon and adapted to mesh with a timing gear 8 mounted on the cam shaft which forms a part of the standard equipment of a Ford automobile, the casing section just referred to being substituted for the timer commonly provided as a part of the standard equipment of the car; an upper hollow circular cup-shaped member 9 constituting the main portion of the timing device shell and having a depending split tubular extension $5^a$ with a clamping bolt $5^b$, and a tube 10 surrounding the shaft 6 and clamped at its upper end in the extension $5^a$, the tube 10 and member 9 being rotatable on the casing section 5 and relative to the shaft 6, and the tube 10 being provided with an arm 11 adapted to be connected with any suitable mechanism, of which the rod 12 is a part, for adapting the tube 10, together with the member 9, and the electrical contacts hereinafter described, and carried thereby, to be bodily rotated, under the control of the operator, relative to the shaft 6 and contact-actuating member hereinafter described and carried by the upper end of this shaft, to advance or retard the spark controlled through the device. The tube 10 and member 9 are held against upward displacement on the shaft 6 by the contact-actuating member above referred to which forms a stop overlapping the member 9. The structure just described is held in position on the car as through the medium of the arms 13 and 14 secured to the front end of the engine and bearing against the casing 5, and the bracket structure 15 secured, at 16, to the front of the engine and having a sleeve portion 17 in which the tube 10 is journaled. The arrangement is such, as shown, that the device is caused to extend upwardly at an angle from the timing gear 8 and in such position as to render the contacts of the device readily accessible for inspection or repair.

The particular timing device shown is provided for controlling the production of ignition sparks, in a 4-cylinder engine, and is of the type involving relatively movable contact members certain of which are in the form of springs successively moved relative to the contacts cooperating therewith, by engagement with a rotatable cam member. The stationary contacts of the timing device, of which four are provided in the construction shown, as above stated, are represented at 18, 19, 20 and 21, and in the particular arrangement shown constitute the threaded rod portions of binding posts represented at 22, 23, 24 and 25, these binding posts extending through a circular side wall 26 of the casing member 9 and being arranged equidistantly, with adjacent ones of these binding posts extending at right angles to each other, the stationary contact-forming portions of the binding posts extending into the interior of the casing 9 as shown. The portions of the side wall 26 through which the binding posts described extend, are formed with bosses 27 at the inner surface of the casing 9 and serve, in conjunction with the binding posts referred to, to support the spring contact members hereinbefore referred to and represented at 28, 29, 30 and 31, these spring members cooperating at their free ends with the stationary contacts 18, 19, 20 and 21, respectively. Each of the spring contact members is formed of a strip of spring metal, as for example steel, each curvedly bent between its ends preferably into the form shown in the drawings to provide the angularly-disposed portions 32 and 33, these spring members being thus curved lengthwise thereof. The spring contacts referred to are secured in position on the casing 9 at their angularly-disposed portions 32, which are apertured as indicated at 34, through which apertures the rod portions of the binding posts referred to extend, these apertures being of considerably larger diameter than the said rod portions. The rod portions of the binding post pass through insulating bushings 35 in the wall 26 and carry insulating washers 36 and 37 against which nuts 38 and 39 are screwed to hold the binding posts and the spring contact members referred to firmly in position on the casing shell 9. The outer ends of the rod portions of the binding posts carry the usual knurled nuts 40 for clamping to these posts the terminals leading to the spark plugs of the several cylinders of the engine, in accordance with common practice. The inner faces of the bosses 27 against which the portions 32 of the spring contacts bear are recessed, as represented at 41, to afford the horizontal seating surfaces 42 for the ends 32 of the spring contacts and the vertical end walls 43 for the adjacent end edges of the portions 32, these recesses being so positioned relative to the apertures in the wall 26 through which the binding posts referred to extend, that when the spring contact members are positioned in the recesses 41, as shown by dotted lines in Fig. 4 and by full lines in Figs. 2 and 3, to seat upon the ledges 42 and against the vertical surfaces 43, the walls of the openings 34 in the spring contact members will be out of contact with the rods of the binding posts and thus these spring members will be insulated from the binding posts, the latter being insulated from the casing 9, by reason of the construction stated. The free ends of the spring contacts 28, 29, 30 and 31 cooperate with stop pins 44, 45, 46 and 47 which rise from the bottom plate 48 of the casing 9, these stop pins being arranged a slight distance beyond the stationary contacts with which the respective spring contacts cooperate, as shown.

Cooperating with the spring contact members, is a rotary contact-actuating member carried on the upper end of the shaft 6 and driven thereby. This member, as shown, comprises a disk 49 secured to the upper end of the shaft 6 and extending into the casing 9, this disk containing a semi-circular opening 50 in its periphery, and a second disk 51 of inverted cup shape adapted to telescope with the disk 49 and containing a roller 52 of insulating material journaled on the disk 51 through the medium of the screw 53 and extending into the groove 50 of the disk 49, this roller extending laterally beyond the periphery of the disk 51 and in the plane of the various spring contact members described. The device just referred to constitutes in effect a cam, and the parts are so constructed and arranged, as shown that the spring contact members remain at all times out of engagement with the respective cooperating stationary contacts of the device, and bear against the respective stop pins referred to under the spring action of the spring contact members, except when the roller portion 52 of the actuating member rolls against these spring contacts as shown of the contact 28 in Fig. 3, in which case the roller 52 flexes the spring contact with which it engages, outwardly, and into engagement with its cooperating stationary contact, it being understood that these spring contact members are thus operated in succession to close the circuit between them and their respective stationary contacts. It is highly desirable in an electrical device of the character stated that the mutually engaging faces of the stationary and movable contact members be maintained in clean and unpitted condition, and this I accomplish by causing the movable strip contacts to exert face-to-face wiping contact against the stationary contacts with which they respectively engage. To this end the portion 33 of each spring contact is bent, as for example to the form represented in the drawing, to cause its bent portion to extend into the path of movement of the actuating cam device above referred to. The portions 33 of the spring contacts thus being normally in bent condition, the engagement of the cam device therewith operates to flex these portions towards straight condition after initial engagement with the stationary contacts, thereby causing the portions 33 to rub at their faces across the faces of the stationary contacts and produce the cleansing and pitting-preventing wiping action referred to.

In the particular arrangement shown all of the spring contact members are in electrical contact with the casing 9, by reason of being clamped against the latter, as stated, and thus in the installing of the device with an internal combustion engine, would constitute the grounded portion of the timer.

It will be understood from the foregoing that by constructing the timer in accordance with my invention it is necessary that only as many binding posts be provided as correspond with the number of the cylinders of the engine. Thus in the arrangement shown only four of the binding posts, corresponding with the four cylinders of the engine with which the device is to be used, are provided on the device.

The provision of the spring contact members as metal strips curved lengthwise thereof to afford the angularly-disposed portions 32 and 33, is of great advantage as the life of the spring is thereby greatly augmented. It may be stated in this connection that I prefer to make the spring contacts referred to of relatively thin gage spring metal, and so form them that when assembled with the other parts as shown and described, these spring contacts will bear against the stop pins 44, 45, 46 and 47, respectively, under spring tension, in which position they are out of engagement with the respective stationary contacts, and furthermore so proportion the parts that these spring contact members except when engaged by the roller device 52, as stated, will be out of contact with the disk 49. Thus the springs are only subjected to such wear as may occur by the rolling friction of the roller 52 against it, as distinguished from the relatively great wear which occurs in those constructions wherein the rotary spring-contact-operating member rubs against these spring contact members continuously.

The casing 9 is, in the particular arrangement shown, provided with a removable and replaceable cover section 54 adapted to be held in place by a pressure arm 55 pivoted at 56 on a lug 57 formed as a part of the casing 9 adapted to bear under its spring action against the center of the cover 54 as shown in Fig. 2.

It may be further stated that it is desirable in timing devices that the spring contact members be made of light metal, and it is also desirable that a quick break be provided for between the spring contact member and the stationary contact with which it cooperates, these two features being combined in my improved construction inasmuch as the spring contact members bear normally, under their spring action, against the stops in which position they are out of engagement with the cooperating stationary contacts.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. In an electrical device, the combination of a support, a spring contact member, and a binding post forming a contact securing said member to said support and insulated from said member.

2. In an electrical device, the combination of a support, a spring contact member, and a binding post forming a contact securing said member to said support and insulated from said member, said support being recessed to receive said member, with its walls so disposed as to position said member on said support out of contact with said post.

3. In an electrical device, the combination of a support, a spring contact member containing an aperture, and a binding post forming a contact extending through said aperture and securing said member to said support and insulated from said member.

4. In an electrical device, the combination of a support, a plurality of spring contact members, a series of binding posts forming a series of contacts for engagement, respectively, by said spring contact members securing said members to said support and insulated from said members, each of said members opposing, for engagement therewith, the binding post of the next adjacent spring contact member, and means for actuating said spring contact members in succession.

5. In an electrical device, the combination of a support, a plurality of resilient contact members in the form of spring strips curved lengthwise thereof and each presenting angularly-disposed portions, said members being arranged in a circular series, a series of binding posts forming a series of stationary contacts for engagement, respectively, by said resilient contact members securing said members to said support, each at one of its angularly-disposed portions and insulated therefrom, each of said members opposing, for engagement therewith, a contact post of the next adjacent resilient contact member, said resilient members extending under their spring action out of engagement with said stationary contacts, a rotary member having a projection for actuating said resilient members, and stops against which said resilient members bear in normal position, said resilient members in normal position being under tension and out of engagement with said rotary member.

6. In a timer, the combination with a relatively fixed contact, of a rotary cam and a spring contact extending under its spring tension normally out of engagement with said fixed contact and bent in a direction to extend at its bent portion into the path of said cam and moved directly thereby against said fixed contact and relative thereto in face-to-face rubbing contact therewith as said cam tends to straighten out said bent portion.

7. In a timer, the combination with a relatively fixed contact, of a rotary cam and a spring contact curved lengthwise thereof and presenting angularly disposed portions at one of which said spring contact is supported, said spring contact extending under its spring tension normally out of engagement with said fixed contact, with the other of said angularly disposed portions bent in a direction to extend at its bent portion into the path of said cam and moved directly thereby against said fixed contact and relative thereto in face-to-face rubbing contact therewith as said cam tends to straighten out said bent portion.

GUSTAF A. SAFSTROM.